(12) United States Patent
Arnold et al.

(10) Patent No.: US 8,882,141 B2
(45) Date of Patent: Nov. 11, 2014

(54) SINGLE RETRACTOR INFLATABLE BELT SYSTEM

(75) Inventors: David R. Arnold, Macomb, MI (US); Lawrence M. Refior, Romeo, MI (US); Steven Richards, Avoca, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 13/881,257

(22) PCT Filed: Oct. 27, 2011

(86) PCT No.: PCT/US2011/058082
§ 371 (c)(1),
(2), (4) Date: Apr. 24, 2013

(87) PCT Pub. No.: WO2012/058422
PCT Pub. Date: May 3, 2012

(65) Prior Publication Data
US 2013/0221642 A1    Aug. 29, 2013

Related U.S. Application Data

(60) Provisional application No. 61/407,678, filed on Oct. 28, 2010.

(51) Int. Cl.
*B60R 21/18*        (2006.01)

(52) U.S. Cl.
CPC ..................................... *B60R 21/18* (2013.01)
USPC ............................ 280/733; 280/734; 280/737

(58) Field of Classification Search
USPC .......................................... 280/733, 734, 737
See application file for complete search history.

(56) References Cited

U.S. PATENT DOCUMENTS

| | | | | |
|---|---|---|---|---|
| 5,472,231 | A * | 12/1995 | France ............................ | 280/733 |
| 5,794,971 | A | 8/1998 | Boydston | |
| 5,863,065 | A | 1/1999 | Boydston | |
| RE36,587 | E * | 2/2000 | Tanaka et al. .................. | 280/733 |
| 6,116,637 | A * | 9/2000 | Takeuchi et al. .............. | 280/733 |
| RE37,280 | E * | 7/2001 | Tanaka et al. .................. | 280/733 |
| 6,378,898 | B1 * | 4/2002 | Lewis et al. .................... | 280/733 |
| 6,533,315 | B2 * | 3/2003 | Brown et al. ................... | 280/733 |
| 6,698,790 | B2 * | 3/2004 | Iseki et al. ..................... | 280/733 |
| 6,837,079 | B1 * | 1/2005 | Takeuchi ........................ | 66/198 |
| 6,951,350 | B2 * | 10/2005 | Heidorn et al. ................. | 280/733 |
| 2002/0105176 | A1 * | 8/2002 | Hammer et al. ............... | 280/733 |
| 2002/0125701 | A1 * | 9/2002 | Devonport ..................... | 280/733 |
| 2007/0001435 | A1 * | 1/2007 | Gray et al. ..................... | 280/733 |

FOREIGN PATENT DOCUMENTS

| | | |
|---|---|---|
| DE | 4306528 A1 | 9/1994 |
| DE | 20216129 U1 | 3/2003 |
| DE | 102010022010 A1 | 12/2011 |
| EP | 2360067 A2 | 8/2011 |

* cited by examiner

*Primary Examiner* — Paul N Dickson
*Assistant Examiner* — Darlene P Condra
(74) *Attorney, Agent, or Firm* — Markell Seitzman (57) ABSTRACT

A safety restraint system having a seat belt (51) and an inflatable air bag (200), the air bag including first (220) and second (222) opposing panels, the first panel including one or more loops (234) and slots (232) to receive a seat belt (51), the air bag and/or seat belt configured to slide relatively to each other along the length of the seat belt.

18 Claims, 6 Drawing Sheets

SINGLE RETRACTOR INFLATABLE BELT SYSTEM

RELATED APPLICATIONS

This application claims the benefit of U.S. Provisional Application 61/407,678 filed on Oct. 28, 2010. The disclosure of the above application is incorporated herein by reference.

FIELD OF THE INVENTION

The present invention relates to a three-point seat belt system having at least one inflatable component.

BACKGROUND OF THE INVENTION

The prior art shows many inflatable seat belt systems; one such system is shown in the PCT patent application WO2009155534A1. This system incorporates two retractors, one to retract the shoulder belt and another to retract the lap belt. Ends of the shoulder belt and the lap belt are fastened securely to a tongue and the shoulder belt includes an inflatable air bag. This system displays superior performance and utilizes a tongue/buckle combination through which inflation gas flows into the inflatable air bag.

Other systems have proposed the use of a single retractor system, however the performance of these systems has been found to be lacking. For example, if the inflatable belt is incorporated as part of the shoulder belt, the thickness of this combination is increased substantially compared to that of a conventional shoulder belt alone. In this type of system it has proved difficult if not impossible to permit the inflatable belt/shoulder belt combination to traverse over the shoulder-high belt loop, which is also referred to as a D-ring.

SUMMARY OF THE INVENTION

The present invention provides a cost-effective single retractor safety belt system having an inflatable bag which does not obstruct the ability of the shoulder belt to protract from and be retracted upon the retractor. More particularly, the invention includes an air bag and seat belt combination in which relative movement of the air bag along the seat belt is permitted. Also, the present invention does not preclude the use of multiple retractors.

The present invention comprises an inflatable air bag and inflatable restraint system, the air bag including first and second opposing panels, the first panel including slots, some of which form loops to receive a seat belt, the air bag and seat belt configured to slide relatively to each other.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 20 through 23E show an alternate embodiment of the invention.

DETAILED DESCRIPTION OF THE INVENTION

Figure 1:
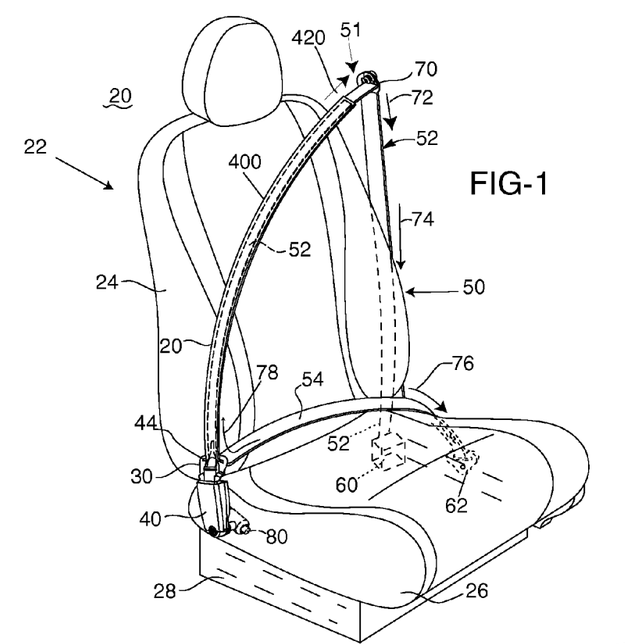
FIG. 1 is an isometric view showing major components of the present invention.

FIG. 1 shows an inflatable seat belt system 20 positioned about a vehicle seat 22 having a seat back 24, seat cushion 26 and a frame 28. Only a portion of the frame of the cushion is illustrated.

System 20 defines a three-point seat belt system comprising a tongue 30, buckle 40 and a seat belt subsystem 50 comprising a single seat belt 51 having a shoulder belt 52 and a lap belt 54. The distal end of the shoulder belt 52 extends from a seat belt retractor 60. As the occupant moves forward and backward relative to the seat the shoulder belt protracts from and retracts back into the retractor in a conventional manner. A distal end of the lap belt is secured by an anchor 62 to the vehicle floor or to seat frame.

Seat belt 51 continuously extends from retractor 60 through a slot in web guide 70, through an opening or slot 44 in tongue 30 and into the anchor 62. In the first embodiment of the present invention the tongue 30 is a modification of the tongue shown in the above-identified PCT patent application which is herein incorporated by reference. Tongue 30 is configured to receive inflation gas and is also configured as a slip-tongue which permits the seat belt 51 to slide therethrough. The buckle 40, in the first embodiment, is the same buckle as disclosed in the PCT patent application. The various arrows 72, 74, 76 and 78 show the movement of various portions of seat belt 51. A slip tongue is generally thought of as a tongue that can easily slide along a seat belt.

Figure 2:
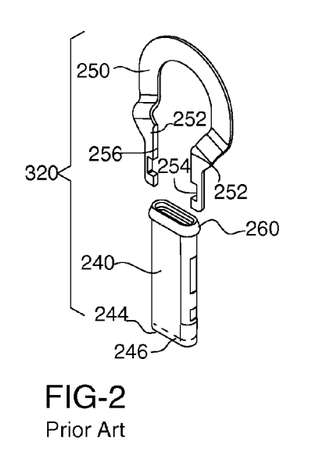
FIG. 2 is a prior art tongue for an inflatable seat belt system.

Reference is briefly made to FIG. 2 which illustrates the tongue shown in the above PCT patent application. The tongue 220 includes a looped portion 250 terminating in opposite legs 252. Each leg 252 includes a notch 254 which forms, in cooperation with a tubular portion 240, an opening to receive latching members of the buckle shown in the PCT patent application. As mentioned above, in the illustrated embodiment, buckle 40 is the same as the buckle shown in the PCT patent application. Flat portions 256 on each of the legs are secured to opposite sides of the tubular portion 240. The tube 240 is hollow and lower edge 244 of the tube is sealed with a frangible, plastic seal 246. The upper end 260 of the tube 240 includes a hollow wider diameter portion.

Figure 3:
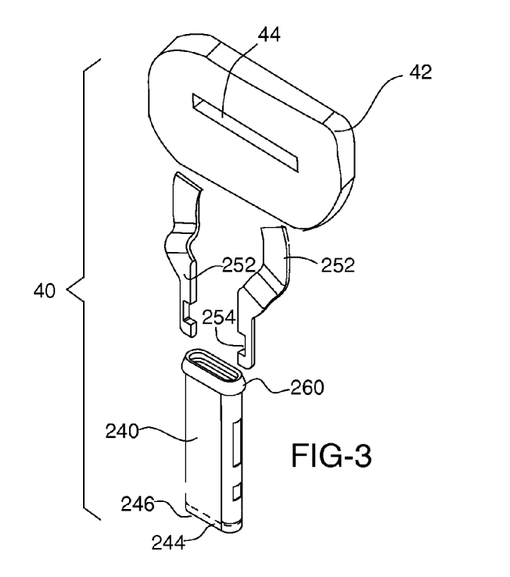
FIG. 3 is an exploded view of the tongue for the present invention.
Figure 4:
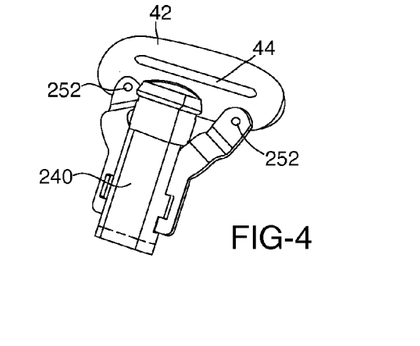
FIG. 4 shows an assembled tongue.
Figure 6:
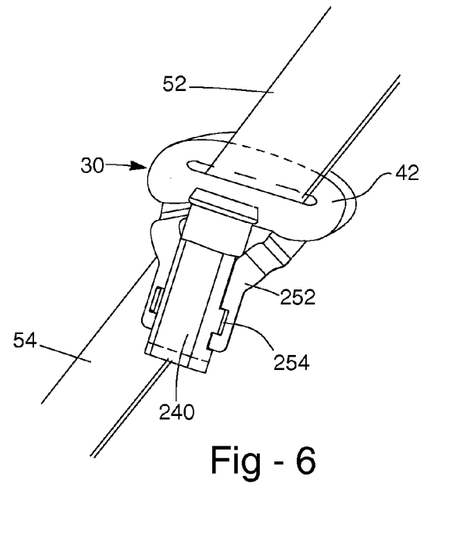
FIG. 6 shows the tongue of the present invention slidably mounted upon a seat belt.

Reference is made to FIG. 3 which shows the features of tongue 30 used in the present invention. In the present invention a head 42 can be molded over the looped portion 250 of tongue 330, assuming the looped portion is of sufficient size to permit the formation of a slot 44 in the head 42 for receiving the seat belt 51. In an alternate embodiment, the looped portion 250 of tongue 210 can be removed and head 42 is molded onto the legs 252. Head 42 includes slot 44 through which seat belt 51 slides. The seat belt 51 is not shown in FIG. 3 but is shown in FIGS. 1 and 6. The head 42 is diagrammatically illustrated in FIG. 3 as well as in FIG. 4. In FIG. 6, the head 42 is shown as being molded about the legs 252 and loop 250. FIG. 4 also shows an alternate embodiment in which the legs 252 are riveted to head 42.

Figure 5:
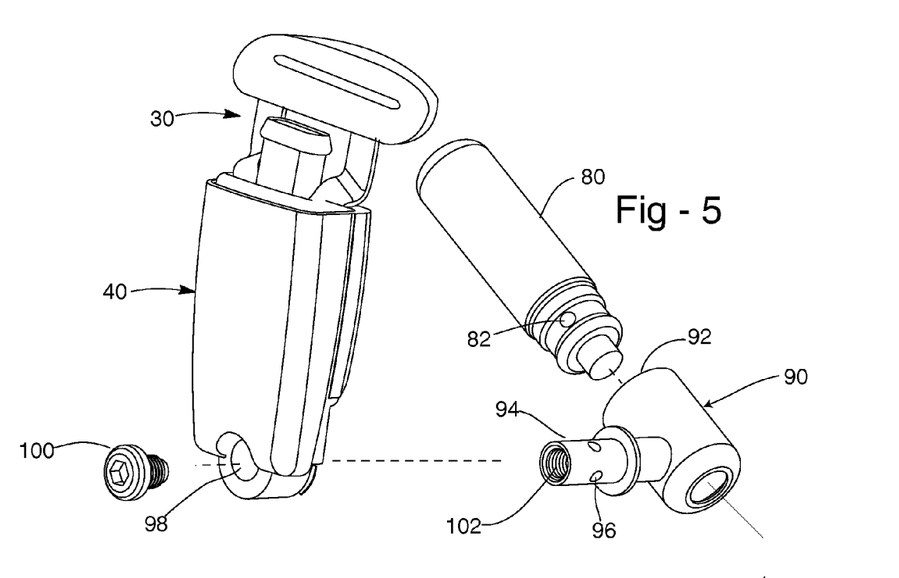
FIG. 5 illustrates a tongue/buckle assembly as well as an air bag inflator.

Reference is briefly made to FIGS. 5 and 6. In FIG. 5, tongue 30 has been inserted within buckle 40. Also illustrated in FIG. 5 is an inflator 80 having exit ports 82. Inflator 80 is received within a hollow passage 92 of a conduit 90. The conduit 90 includes an exit passage generally shown as 94; the exit passage includes a plurality of exit ports 96. The exit passage 94 is inserted within a bore or passage 98 in buckle 40. Passage 98 is sealed on one side by a fastener 100 and/or a separate seal, the fastener 100 received within threaded end 102 of passage 94. The other side of passage 98 is sealed by the flange 104 formed about passage 94. Inflator 80 is secured to frame 28 in a portion of the seat as illustrated in FIG. 1 or secured to a part of the vehicle such as the floor or structural pillar. One or more sensors associated with occupant protection systems, upon sensing a crash, cause the inflator 80 to activate, which causes inflation gas to flow into conduit 90, through the various passages and then in and through buckle 40, through tongue 30 and into the air bag inflating the air bag.

Figure 7:
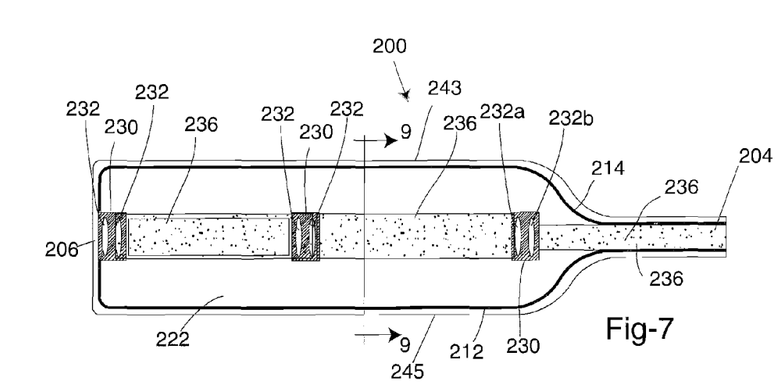
FIG. 7 is a plan view of an air bag usable with the present invention.
Figure 8:
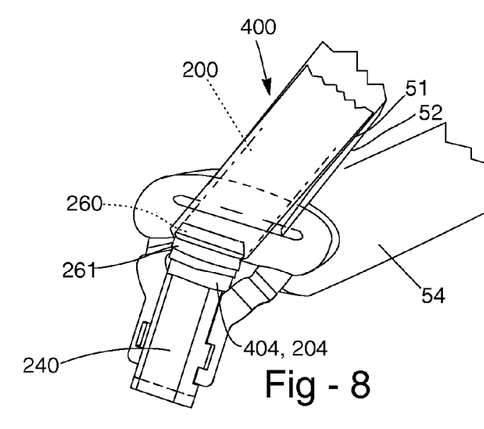
FIG. 8 is another view of the tongue in relationship to the seat belt.
Figure 9:
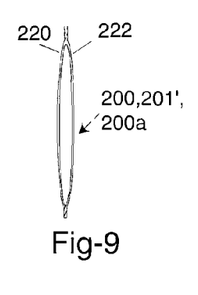
FIG. 9 is a cross-sectional view through section 9-9 of FIG. 7.

FIG. 7 illustrates one version of an air bag 200 usable with the present invention. Air bag 200 includes an inlet passage such as a narrowed neck having an end 204. End 204 is received upon widened tip 260 of tube 240 of tongue 30 as illustrated in FIG. 8. End 204 will typically be secured to tip 260 by a clamp 261 of known variety. Air bag 200 includes a larger inflatable portion 210 and a border thereabout, part of which forms a non-inflatable end border or end 206. The air bag includes one or more peripheral seams such as 212 and 214; the border is exterior to these seams. The air bag can be made in a variety of ways including simultaneously forming two opposing panels 220 and 222 on the loom with integrally formed seams 212 and 214; some air bag manufacturers refer to this procedure as a one-piece-woven process or air bag. The air bag 200 can be made using conventional sewing techniques where two substantially identical panels of woven material 220 and 222 are sewn together at the locations of seams 212 and 214.

Figure 23A:
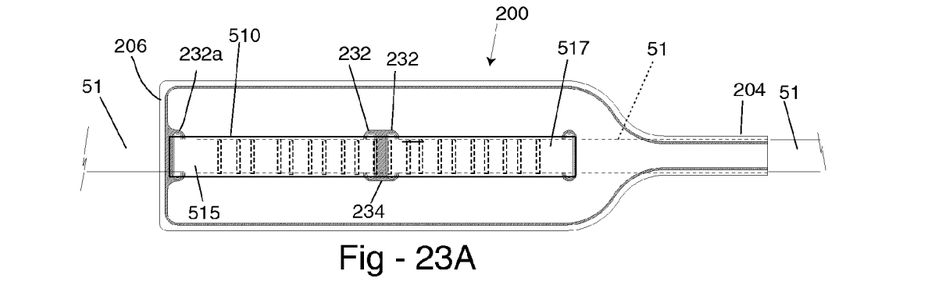

Air bag 200 includes a plurality of joints or formations 230. These formations 230 join panels 220 and 222 together at various locations. These formations 230 can be formed by using the one-piece-woven technique or formed by a plurality of sewn seams with stitches (see FIG. 12). The primary purpose of these formations 230 is to act as a seal, preventing gas within the air bag from migrating through to each slit 232, 232*a* and 232*b* formed within or cut from each formation 230. In FIGS. 7, 7A, 10, 12 and 14, slots or slits 232 (which are used interchangeably) are paired to form loops 234. Slots 232*a* and 232*b* also form another loop 234 which, as can be seen, may not be used. The slots 232*a* and 232*b* can be used together or separately. The seat belt 51, and more particular the shoulder belt, can be passed under or above the various loops 234. By choosing which slot 232, 232*a* and/or 232*b*, a portion of the seat belt can be placed under or on top of the neck of the air bag or on top of or under the rear 206 of the bag. The air bag 200*a* shown in FIG. 7A includes only a single slot 232*a* at the rear end of the bag, two slots 232 in the middle forming a loop 234 and a single slot 232*b* closer to the neck end. In this configuration the seat belt exits below the air bag at its neck and below the rear end, see FIG. 23A.

Air bag 200 of FIG. 7, or any disclosed therein, may be made of woven material such as nylon or polyester. The air bag 200 or any disclosed therein can also be formed as a film. The woven material can be uncoated or coated with an impermeable material such as silicon. Typically if the air bag is made of uncoated woven material, the denier of the individual thread is relatively low, in the range of about 210*d* to 315*d*. In a coated air bag the denier can range from a thin to a thick thread as the coating covers or coats inter-thread spaces (not shown).

As mentioned above, one of the distinguishing characteristics of the present invention is that air bags disclosed herein can move relative to the seat belt or are initially secured to the seat belt, permanently or not, such as being sewn. Reference is made to the cloud of dots 236 located between each formation and which also extend toward the end 204 of the air bag. These dots diagrammatically identify the location of a low friction region or regions of the air bag 200. By including such low friction regions the air bag and seat belt can slide freely. For example, the air bag 200 could be coated with Teflon which is generically referred to as polytetrafluoroethylene or PTFE, made with a Teflon coated fiber or made with other slippery material placed in these regions. The low friction areas would also include the underside of the loops 234 as well as any other regions in which the air bag and seat belt contact each other on the panels 220 and 222. If the air bag is made using two separate panels that are sewn together, one of the panels such as 222 could include one or more strips 236*a* (see for example FIG. 12) of Teflon impregnated fabric or a Teflon film sewn to panel 220 and under the loops 234 and other contact areas of panel 222. Providing a low friction region in these locations will permit the seat belt 51 and air bag 200 to slide more easily relative to each other.

It should be understood the extra coating of a low friction material is not needed if the effective coefficient of friction of the air bag material or seat belt material are sufficiently low and slippery. Other embodiments show the low friction regions can be achieved using an inner sleeve. One such inner sleeve includes the use of a permanently bent-over sheet of Teflon or other material as in FIG. 22 forming an open sided U or V-shaped tube, sleeve or trough 500 or a closed sided tube as in FIG. 21, sleeve or trough 510. Each sleeve is secured to the air bag in a manner that will not cause the air bag to leak but will permit the seat belt to slide therethrough. One such construction is to secure ends of the sleeve 500 or 510 to a non-inflatable portion of the air bag such as to an exterior border. As will be seen, tubes 500 or 510 are threaded through a loop 234 and slots; the seat belt 51 slides inside the inner tube, sleeve or trough 500 or 510. The top and bottom edges of the bag are shown by numerals 253 and 255 as illustrated in FIGS. 12, 14 and 15.

Figure 10:
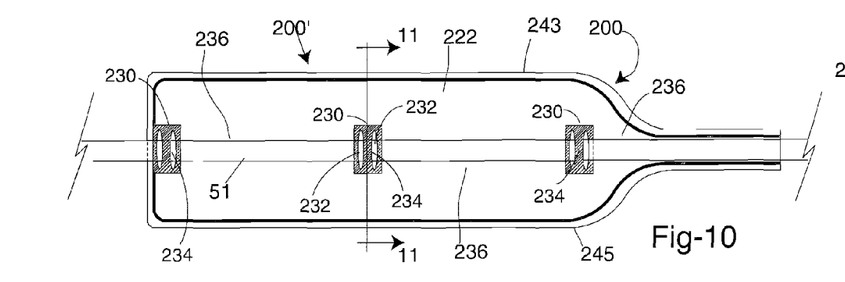
FIG. 10 shows the air bag of FIG. 7 with the seat belt created through it.
Figure 11:
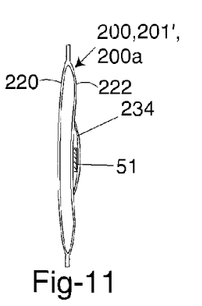
FIG. 11 is a cross-sectional view through section 11-11 of FIG. 10.

Reference is made to FIGS. 10 and 11; the air bag shown in FIG. 10 is substantially identical to the one shown in FIG. 7. In this exemplary view the seat belt 51 is threaded through a loop 234 in each formation 230. The loops 234 can be formed by creating two slits 232 in each of the formations 230. The air bag 200 and seat belt 51 are relatively movable. Further, FIG. 10 shows the relationship between seat belt 51 and the low friction regions 236 of the air bag. As can be appreciated the seat belt 51 slides through the loops 234 and across the other contact regions 236 which may be formed by different material or the sleeves 500 and 510 shown in FIGS. 23-23E. FIG. 11 is a cross-sectional view showing the opposing panels 220 and 222 with the seat belt 51 held close to panel 222 by one of the loops 234.

Figure 12:
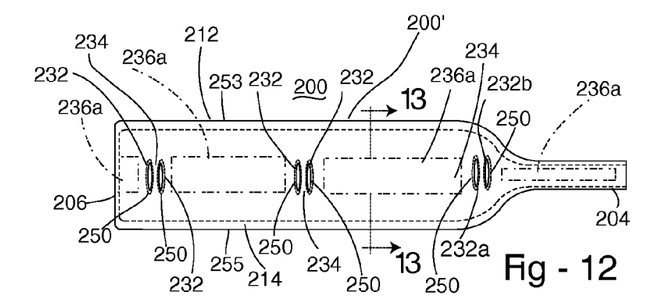
FIGS. 12 and 13 show an alternate embodiment of the invention.
Figure 13:
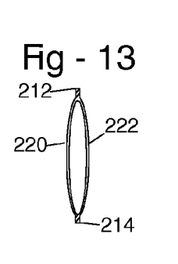

Reference is briefly made to FIGS. 12 and 13 which illustrate an alternate embodiment of the present invention. Air bag 200' is formed using two separate panels 220 and 222 which are sewn together using a single peripheral seam 272, 214 in a conventional manner forming a border about the inflatable parts of the air bag. The slit-formations 230 are first formed by pairs of oval-shaped seams 250. The slots 232, 232a and 232b are located with seams 250 forming the loops 234. Both panels are cut interior of each seam 250; each cut is shown by numeral 232, 232a and/or 232b. The seat belt is threaded through one or more loops and slits as desired. In this embodiment the belt 51 exits the bag under the neck of the bag but by selecting another set of slits the belt could exit on top of the neck 204.

Figure 14:
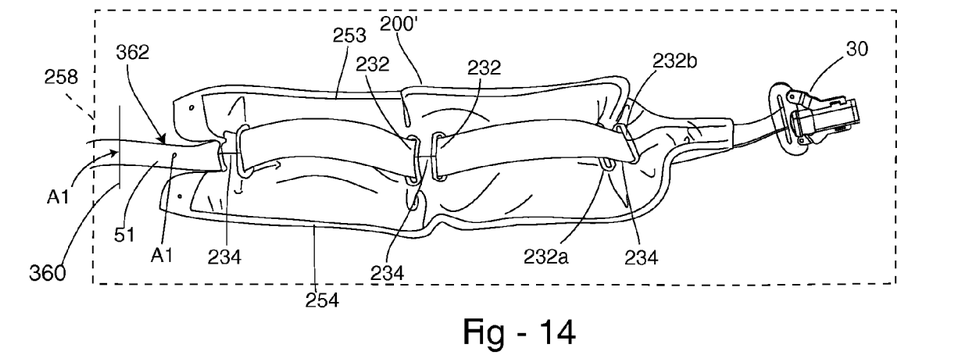
FIG. 14 illustrates an inflated air bag with a section of seat belt threaded therethrough.
Figure 15:
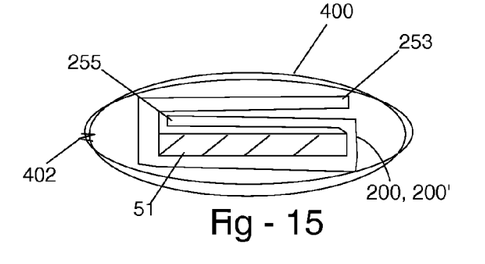
FIG. 15 is a cross-sectional view showing the air bag folded about a portion of a seat belt with this combination enveloped by a flexible tube.

FIG. 14 shows one of the benefits of the present invention. FIG. 14 illustrates air bag 200' in an inflated condition with seat belt 51 captured within the various loops 234 and slits 232, 232a and/or 232b. Air bag 200' is shown in an inflated condition while placed upon a flat surface 258. With the air bag uninflated and lying flat on surface 258, line 360 is indicative of the location of one point A1 on seat belt 51. After the air bag 200' is inflated the seat belt 51 will conform to the curved inflated shape of the air bag 200' as shown. Arrow 362 shows the final post inflation location of point A1 after point A1 has moved to the right in this figure. The movement of the seat belt 51 will occur as described when the air bag 200' and seat belt 51 combination is installed in a vehicle and the tongue 30 locked to the buckle and with the refractor 60 locked. As can be appreciated, the relative movement of seat belt 51 as the air bag 200' inflates effectively removes slack in the seat belt 51 about the occupant. This removal of the slack in a seat belt system 50 is typically accomplished by a pretensioner 80 (also referred to in the art as a belt-tightener) and this pretensioning action is now achieved by the present invention.

The various air bags 200, 200' described herein will directly or indirectly envelop the seat belt 51. With seat belt 51 in place, threaded through loops 234 are inserted into slots 232a or 233b, the sides 253 and 255 of the air bag are each respectively folded over seat belt 51 to achieve the configuration generally shown in FIG. 15. FIG. 15 is a cross-sectional view showing this folded-over configuration. The now narrowed, folded-over air bag and seat belt 51 are inserted within a woven, generally flat tube 400; tube 400 is also referred to as an outer tube. In FIG. 15, tube 400, for the purpose of illustration, is shown to be generally oval in cross-section. The tube is preferably of the same material and color as is the seat belt 51. Tube 400 includes a frangible edge 402 which runs its length and ends 404 and 406 shown in FIG. 16.

Figure 16:
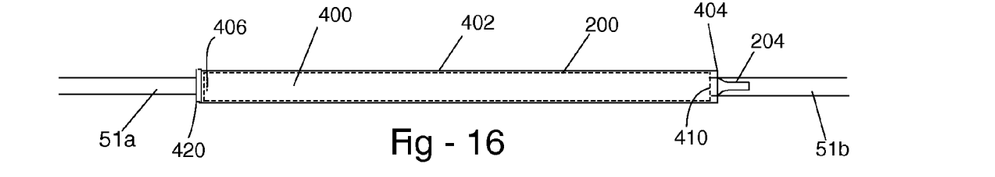
FIG. 16 diagrammatically shows a tube surrounding a folded air bag with a portion of a seat belt slidingly extending through the tube and air bag.

FIG. 16 is a plan view showing tube 400 with the air bag 200 positioned within tube 400 and the seat belt extending through the folded-over air bag and tube 400. Numerals 51a and 51b show portions of seat belt 51 extending from the tube/air bag combination. Additionally, the narrowed end 204 is also shown positioned above portion 51b of seat belt 51. In further embodiments shown in FIGS. 20-23E, the seat belt is first fitted within a flexible, semi-rigid second or inner tube 500 or 510. The bag is folded about the inner tube 500 or 510 and this combination of the second or inner tube, folded air bag and seat belt is appropriately threaded through the outer tube 400.

Outer tube 400 of FIGS. 15 and 16, which protects the air bag, is exposed and in view by the occupant or its user. In this embodiment it is preferred that the first or outer tube 400 should not moved relative to the air bag, seat belt or inner tube (as described later). One or both ends of tube 400 should be fixed to the air bag and or the tongue. In this embodiment of the invention end 404 of tube 400 is fixed relative to end 204 of air bag 200. This can be done by tacking a portion of the tube 400 to a non-inflatable portion of air bag 200 proximate end 204 or to a non-inflatable portion proximate slot 232b. Dashed lines 410 illustrate seams used to secure the tube 400 to air bag 200 clearly shown in FIG. 16.

In another preferable embodiment end 204 of air bag 200 is first positioned about the enlarged end 260 of the tongue 30; thereafter, end 404 of tube 400 is positioned about end 204. Both ends 404 and end 204 are secured by a clamp 261 to the tongue 30. As can be appreciated, the seat belt 51 will still be able to slide relative to the air bag. This preferred relationship is illustrated in FIG. 8. End 406 of the exterior sleeve 400 can be tacked, stitched or otherwise secured to a non-inflating end of the air bag as shown in FIG. 16. Also, as shown in FIG. 16, end 406 of tube 400 is positioned about seat belt 51 as well as portions of the air bag 200 that are located within tube 400. The end 406 of tube 400 will moveable toward and away from a D-ring or web guide 70 normally used in seat belt systems. Over time a continuing contact of the air bag with the D-ring may cause wear of the air bag at end 406 if not protected.

Figure 17:
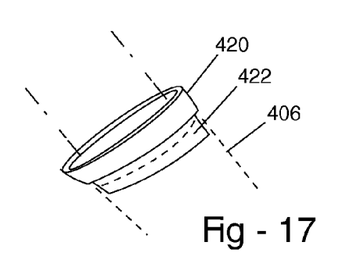
FIG. 17 shows an optional hollow plug that is insertable within an open end of the tube of FIG. 15.

To reduce wear of end 406, end 406 may be topped with a hollow collar 420. In cross-section the shape of the collar 420 is flattened such as being oblong or oval to closely conform to the cross-section of the folded air bag 200, 200'. Collar 420 is illustrated in FIG. 17. Collar 420 includes a tubular connector portion 422. The connector portion 422 is also cylindrically shaped, hollow and oval and positioned on the inside of or about end 406 of the outer tube 400 protecting end 406. Collar 420 is diagrammatically illustrated in FIG. 16. When air bag 200 is inflated the tube 400 separates from collar 420 which remains looped about seat belt 51. The collar 420 can be secured to end 406 by stitches, glue, welding (in general the tube is made of a polymer or copolymer as is the air bag).

Figure 18:
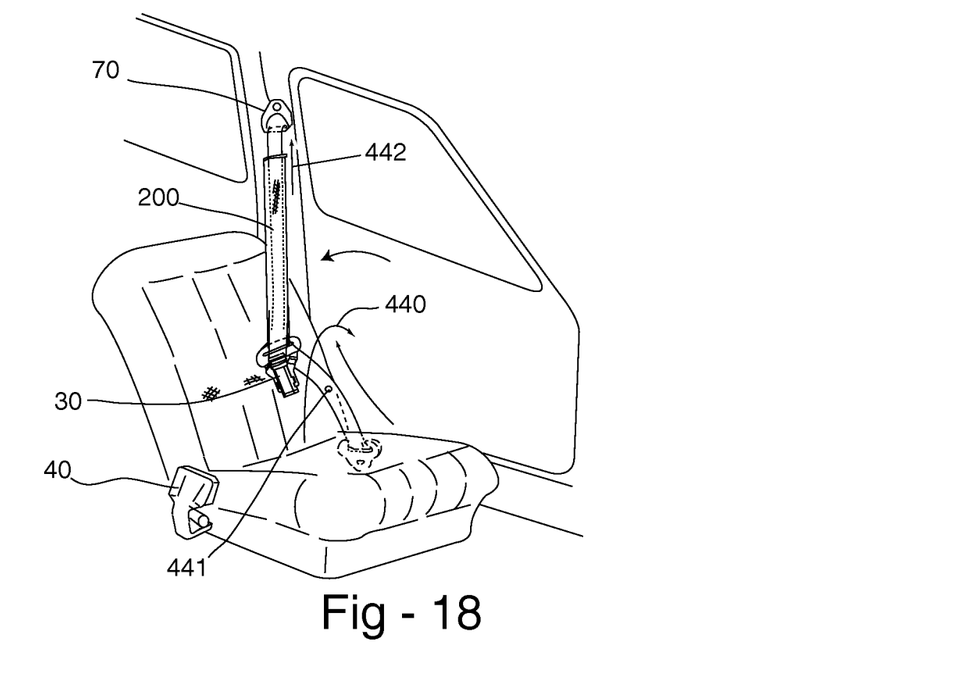
FIG. 18 shows a 3-point seat belt system as it is changing from the occupant-protecting condition shown in FIG. 1 to a stowed condition.

Reference is made to FIGS. 1 and 18. FIG. 1 shows system 20 in its buckled-up position. While the occupant is not shown it can be appreciated that in this position system 20 will protect the occupant in the same manner as any conventional three-point seat belt system. In this position, air bag 200, 200' in any of the air bag embodiments described herein and exterior tube 400 and shoulder belt 52 extend across the chest of the occupant. In this orientation, this combination provides protection for the upper torso of the occupant. For crashes in which the air bag is not activated this protection is primarily provided by the shoulder belt 52. The lap belt 54 will typically cross over the hips of the occupant and keep the occupant from sliding forward in the seat. As mentioned above, any air bag 200, 200', etc disclosed herein is configured to be movable relative to seat belt 51 and this feature is explained in connection with FIGS. 1 and 18.

In FIG. 18 tongue 30 has been detached from buckle 40. Retractor 60 begins to rewind seat belt 51 on a spool within retractor 60. As seat belt 51 is rewound, tongue 30 moves upwardly toward the D-ring 70 carrying with it the tongue 30, folded air bag 200, 200', tube 400 with internal tubes 500, 510 if used, and seat belt 51. This inward and upward movement of the seat belt, air bag, and sleeve or sleeves is shown by arrow 440. Additionally, as the tongue moves in the manner described above, seat belt 51 may also slide through air bag 200 under the action of the rewind spring of the retractor. Sliding movement of the seat belt through the bag is not inhibited in view of the low friction contact surfaces used; the air bag remains secured to the tongue 30. At some moment, end 406 of the tube 400 or alternatively collar 420 will impact D-ring 70. Since seat belt 51 is decoupled from the air bag and tube 400, the seat belt 51 will continue to slide within the air bag and tube 400 until all the seat belt 51 has been wound about the spool of the retractor. At this point tongue 30, which as mentioned above is a slip-tongue, may slide down seat belt 51 and come to rest at a stopping mechanism 441 (used in conventional seat belt systems). In the prior art this stopping mechanism 441 is formed as a button that pierces the seat belt 51 or other obstruction. At this point seat belt 51, air bag 200 and tube 400 are in their respective parked or stowed position generally in line with the imaginary line running from D-ring 70 to the location of retractor 60.

When it is once again desired to position the seat belt 51, air bag and tube about the occupant, the occupant will grab tongue 30 or exterior tube, reposition the tongue closer to the buckle and insert the tongue in the buckle. In doing so, the seat belt 51 is pulled out from the retractor. The seat belt 51 will slide through the slot 44 of the tongue 30 and slide through the folded air bag and exterior tube 400.

Figure 19:
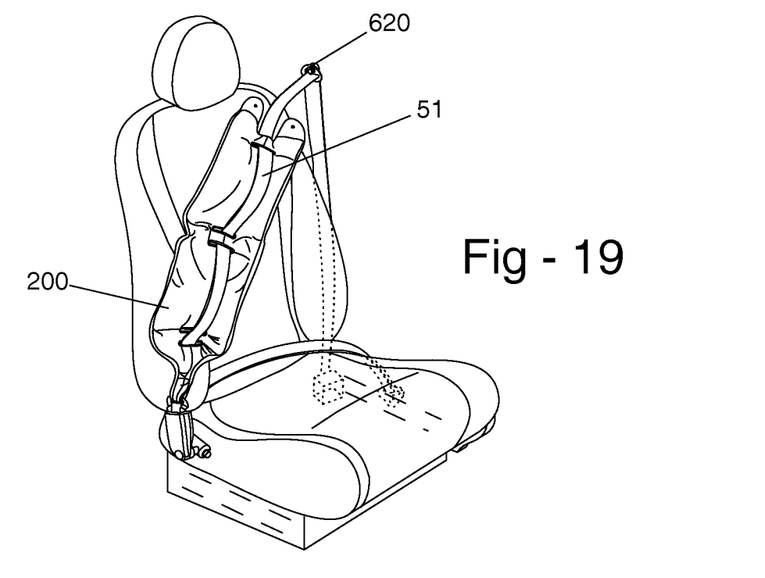
FIG. 19 shows an inflated air bag in an occupant protecting position.

During an emergency, inflator 80 is activated causing air bag 200 or 200' to begin to inflate. As air bag 200, 200' inflates, tube 400 tears along its frangible edge seam 402. The inflated air bag will take the position generally illustrated in FIG. 19. In this embodiment the air bag is located against the occupant with the seat belt 51 positioned on an exterior side of the inflated air bag. As can be seen from the various drawings, the seat belt 51 proximate the tongue 30 is located below the neck 204 of the air bag, closer to the occupant's inside hip to protect the occupant. Depending upon the configuration of the slips 232 the seat belt proximate the outer shoulder of the occupant may be under or over the rear end of the air bag.

Figure 7A:
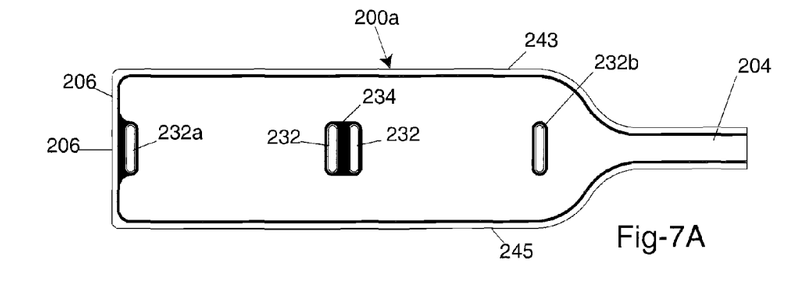
FIG. 7A is a plan view of another embodiment of the air bag.
Figures 20, 21, 22, 23, 23B, 23C, 23D, 23E:
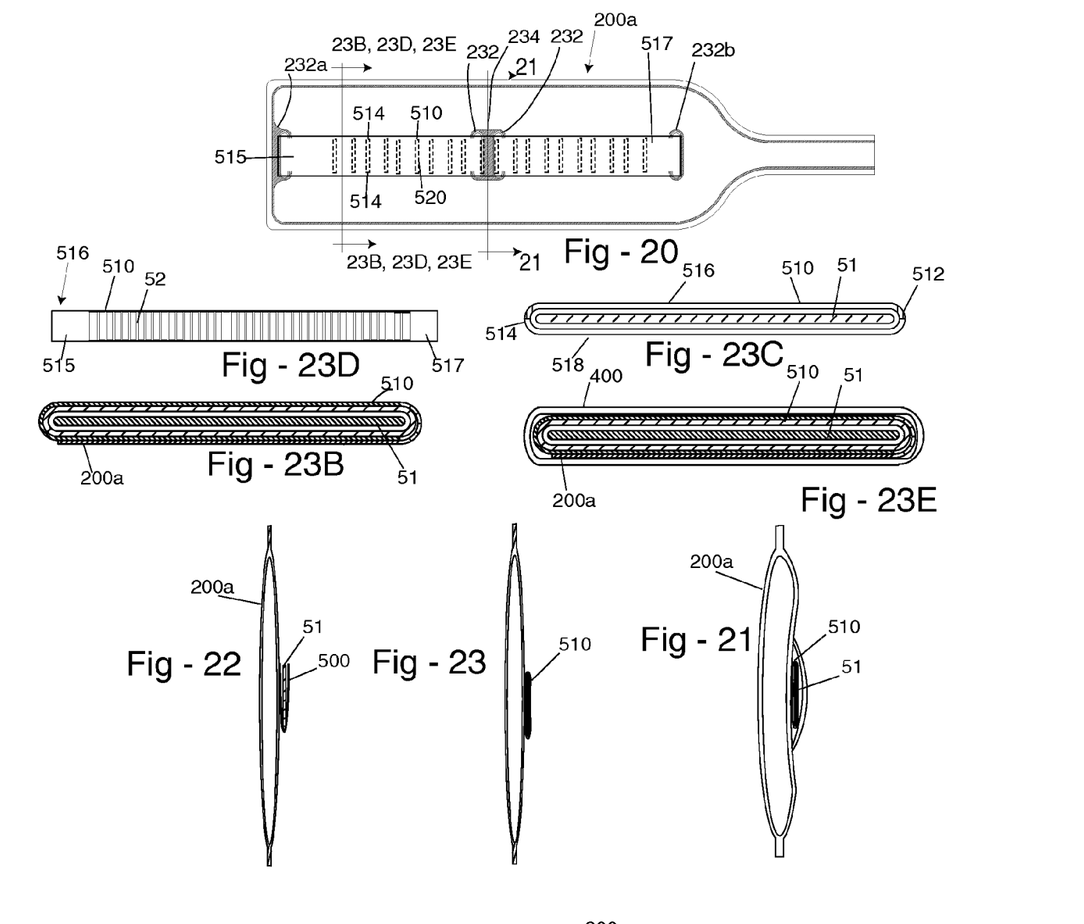

Reference is now made to FIGS. 20-23E which show alternate embodiments of the invention. In this embodiment the air bag 200a shown in FIG. 7A is used, however any air bag 200, 200' can be used. In this embodiment tube, sleeve or trough 500 or 510, having a low coefficient of friction, is threaded through the loops and into and out of various slots 232, 232a and/or 232b of the air bag 200a, as shown in FIG. 20. As mentioned, sleeves 500 and/or 510 are also referred to as an inner tube, sleeve or trough. Either sleeve, after the air bag is folded thereabout, is also inserted into the outer sleeve 400. Each sleeve 500 and 510 is flexible so it can bend about its longitudinal axis as the air bag inflates. Each sleeve is preferably stiff enough so it will not collapse when an inwardly directed force or forces are applied to its top and bottom sides 512 and 514. Either tube could also be sufficiently stiff so as not to compress when a force or forces are applied to its sides 516 and/or 518 in a pinching acting against the belt.

In the embodiment shown in FIGS. 22 and 23 the sleeve 500 has an open cross-section such as having a U or V-shape while sleeve 510 has a closed cross-section. Both sleeves are relatively flat to conform to the flattened oval or oblong shape of the seat belt, see FIG. 23C. Seat belt 51 is inserted through sleeve either 500 or 510, preferably after the sleeve has been placed upon or within the air bag as described above. It is contemplated either sleeve can be made of low-friction material such as Teflon, HDPE, nylon or even polypropylene to permit belt 51 to slide easily therethrough. The desired physical characteristics mentioned above can be obtained by appropriate material selection or by controlling the thickness of various portions of the tube, such as the thickness of the sides 516 and 518 or top and bottom 512 and 514.

FIG. 23D is an isolated plan view of sleeve 500. It should be understood the sides 516 and 518 can be of uniform consistence, such as flat and not include any openings or slots 520 which are illustrated in the version of sleeve 510 shown in these figures. Sleeve 510 includes a plurality of slots or grooves 520 which generally run to the top or bottom 512 and 514 or close thereto. The outer regions 515 and 517 closer to the end of side 516 of sleeve 510 need not include the slots. Having unslotted end portions 515 and 517 may make it easier to secure the sleeve 500 or 510 to the air bag or to the tongue (in which case the sleeve needs to be sufficiently long to reach the tongue tube or include an extension, for example a length of seat belt). These slots 520 make it easier for the sleeve 510 to bend along its longitudinal axis. In the embodiment illustrated position, side 516 with the slots 520 faces the occupant, making it easier for this inner tube, sleeve or trough 510 to bend about the inflating air bag and to be deformed as the occupant loads the air bag. The slots can be formed across side 518 too. The slots can also be formed in the sleeve 500. In the embodiment shown in FIGS. 18 and 19 the seat belt 51 for the most part is positioned on an exterior side of the air bag.

Many changes and modifications in the above-described embodiment of the invention can, of course, be carried out without departing from the scope thereof. Accordingly, that scope is intended to be limited only by the scope of the appended claims.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A safety restraint system having a seat belt and an inflatable air bag, the air bag configured to permit relative movement of the air bag along the length of the seat belt, the air bag including first and second opposing panels, the first panel including loops to receive a seat belt, the air bag configured to slide relatively along the length of the seat belt; wherein the second panel has loops aligned with the loops of the first panel, the first and second panels having slits or slots cut on each side of their respective loop, the peripheral perimeter of each slit or slot of both panels being sewn together or otherwise affixed to seal the airbag and wherein the seat belt it passes through the loops affixing the belt to the airbag and the belt and airbag being movable relative to the other.

2. The safety restraint system of claim 1 wherein the airbag has three or more loops through which the seat belt is passed and is held.

3. The safety restraint system of claim 2 wherein the airbag has a slick surface at the location the seat belt is positioned to facilitate sliding of the airbag along the seat belt.

4. The safety restraint system of claim 1 wherein the loops have a slick surface for contacting the seat belt.

5. The safety restraint system of claim 1 wherein the restraint assembly further is characterized by an inner sleeve, the inner sleeve being a low friction material secured to the airbag along a non-inflatable portion of the airbag wherein the seat belt slides inside the sleeve.

6. The safety restraint system of claim 5 wherein the sleeve is bent over in the shape of a "V" or "U".

7. The safety restraint system of claim 5 wherein the sleeve is a closed sided tube.

8. The safety restraint system of claim 5 wherein the sleeve is a trough.

9. The safety restraint system of claim of claim 5 wherein the material of the sleeve is a sheet of polytetrafluoroethylene (PTFE) or other slick plastic or woven material.

10. The safety restraint system of claim 1 is further characterized in that the airbag has a narrow neck portion extending toward a tongue in the form of a tube through which inflation gases are directed to fill the airbag.

11. The safety restraint system of claim 10 wherein the neck portion or a region near the neck portion is attached to the seat belt.

12. A safety restraint system having a seat belt and an inflatable air bag, the air bag configured to permit relative movement of the air bag along the length of the seat belt, wherein the air bag including first and second opposing panels, the first panel including loops on the exterior of the first panel, to receive a seat belt, the air bag configured to slide relatively along the length of the seat belt, further characterized by an outer tube and wherein the seat belt is looped through the airbag, the airbag after being folded around the seat belt along the length of the airbag is positioned within the tube.

13. The safety restraint system of claim 12 wherein the outer tube has a frangible edge running the length of the tube to each end of the tube.

14. The safety restraint system of claim 13 wherein one or both ends of the tube are sewn or otherwise fixed to the airbag or the airbag and tongue, or the tongue.

15. The safety restraint system of claim 13 wherein the airbag has a narrow end, the narrow end positioned about an enlarged end of a tongue, wherein both the ends of the tube and airbag are secured by a clamp to the tongue.

16. The safety restraint system of claim 13 wherein both ends of the outer tube are tacked, stitched or otherwise secured to a non-inflating end of the airbag.

17. The safety restraint system of claim 16 wherein one end of the tube is movable toward and away from a D-ring or web guide of the restraint system.

18. The safety restraint system of claim 17 wherein a hollow collar is fixed to and covers or tops the end of the tube to prevent wear.

* * * * *